United States Patent
Sullivan et al.

(10) Patent No.: US 10,023,050 B1
(45) Date of Patent: Jul. 17, 2018

(54) TRANSFER CASE

(71) Applicant: BorgWarner Inc., Auburn Hills, MI (US)

(72) Inventors: Christopher Sullivan, Rochester Hills, MI (US); Martin P. Keating, Plainfield, IL (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 15/402,284

(22) Filed: Jan. 10, 2017

(51) Int. Cl.
| | | |
|---|---|---|
| *B60K 23/08* | (2006.01) |
| *F16H 57/021* | (2012.01) |
| *B60K 17/02* | (2006.01) |
| *B60K 17/344* | (2006.01) |
| *F16D 13/52* | (2006.01) |
| *F16D 13/68* | (2006.01) |
| *F16D 13/70* | (2006.01) |
| *F16D 28/00* | (2006.01) |
| *F16D 23/12* | (2006.01) |

(52) U.S. Cl.
CPC .......... *B60K 23/08* (2013.01); *B60K 17/02* (2013.01); *B60K 17/344* (2013.01); *F16D 13/52* (2013.01); *F16D 13/683* (2013.01); *F16D 13/70* (2013.01); *F16D 23/12* (2013.01); *F16D 28/00* (2013.01); *F16H 57/021* (2013.01); *B60Y 2400/4244* (2013.01); *B60Y 2400/82* (2013.01); *F16D 2023/123* (2013.01)

(58) Field of Classification Search
CPC ...... B60K 23/08; B60K 17/02; B60K 17/344; F16D 13/683; F16D 13/52; F16D 23/12; F16D 28/00; F16D 13/70; F16D 2023/123; F16H 57/021; B60Y 2400/82; B60Y 2400/4244
See application file for complete search history.

(56) References Cited

U.S. PATENT DOCUMENTS

| | | | | | |
|---|---|---|---|---|---|
| 5,275,253 | A | * | 1/1994 | Sperduti | B60K 17/3465 180/247 |
| 5,407,024 | A | * | 4/1995 | Watson | B60K 17/342 180/248 |
| 5,674,147 | A | * | 10/1997 | Tobita | B60K 17/3467 74/665 GA |

(Continued)

*Primary Examiner* — Victor L MacArthur
(74) *Attorney, Agent, or Firm* — Warn Partners, P.C.

(57) ABSTRACT

A transfer case for a vehicle having a selective four wheel drive mode of operation is provided. The transfer case includes a front shell boltably connected with a rear shell, a front axle output shaft and sprocket, and a main input shaft torsionally connected with a transmission and rear axle of the vehicle. A main sprocket is provided, rotatably mounted on the main input shaft. The sprocket has an axial extension. A chain torsionally connects the main sprocket with the front axle output sprocket. A clutch housing having a splined opening is torsionally connected with the main sprocket extension. A hub is spline connected on the main input shaft. A clutch pack is selectively torsionally connected with the clutch housing and with the hub. A pressure plate is provided to actuate the clutch pack. An electrically powered ball ramp mechanism is provided for axially displacing the pressure plate to torsionally join the main input shaft to the front axle input shaft causing the main sprocket extension to contact the hub.

2 Claims, 7 Drawing Sheets

(56) References Cited

U.S. PATENT DOCUMENTS

| | | | | |
|---|---|---|---|---|
| 5,771,477 A | * | 6/1998 | Showalter | B60K 17/3467 |
| | | | | 180/247 |
| 5,839,328 A | | 11/1998 | Showalter | |
| 5,842,947 A | * | 12/1998 | Weilant | F16H 63/3003 |
| | | | | 475/207 |
| 6,568,519 B2 | * | 5/2003 | Lovatt | F16D 7/027 |
| | | | | 180/233 |
| 6,935,476 B2 | * | 8/2005 | Kurmaniak | F16D 27/115 |
| | | | | 192/35 |
| 7,172,528 B2 | * | 2/2007 | Yu | B60K 17/3467 |
| | | | | 475/201 |
| 7,338,403 B2 | * | 3/2008 | Puiu | B60K 17/16 |
| | | | | 192/35 |
| 7,384,366 B2 | * | 6/2008 | Kelley, Jr. | B60K 17/344 |
| | | | | 180/248 |
| 7,395,910 B2 | * | 7/2008 | Weilant | F16D 27/115 |
| | | | | 192/110 R |
| 7,435,199 B2 | * | 10/2008 | Showalter | B60K 17/3467 |
| | | | | 74/606 R |

\* cited by examiner

TRANSFER CASE

FIELD OF THE INVENTION

The field of the present invention is that of transfer cases for normally two wheel rear drive mode vehicles with selective four wheel all-wheel-drive mode of operation.

BACKGROUND OF THE INVENTION

Many automotive vehicles have rear wheel drive. Additionally many automotive vehicles with rear wheel drive have selective four wheel drive capabilities which are actuated upon operator command or automatically actuated in response to a slip condition of the powered rear wheels of the vehicle. To provide four wheel drive capabilities in the vehicle, there is provided a transfer case 7 (FIGS. 1-6). The transfer case 7 is typically provided at an output of the vehicle's transmission (not shown). The transfer case 7 often has an outer housing provided by front 10 and rear 12 shells boltably connected to one another. A front axle output shaft 14 is bearingly supported in the front and rear shells 10,12. A front axle output sprocket 21 is torsionally connected on the front axle output shaft 14. A main input shaft 22 is bearingly supported directly or indirectly by the front and rear shells 10,12. The main input shaft 22 has a radial shoulder 24 providing a stop. The main input shaft 22 is torsionally connected with an output shaft of the transmission of the vehicle (not shown) and rear axle (via a prop shaft and differential) of the vehicle (not shown). A first thrust bearing 26 is provided. The first thrust bearing 26 has a race 28 on its front end that is adjacent the radial shoulder 24 on the main input shaft 22. A main sprocket 30 is provided that is rotatably mounted on the main input shaft 22 by a bushing 31. The main sprocket 30 has an axial front side positioned against a rear race 29 of the first thrust bearing 26. The main sprocket 30 also has a radially inward axially rearward extending extension 64 having a splined outer diameter surface 70. The extension 64 also has a rear axial face 68. A chain 72 is provided which torsionally connects the main sprocket 30 with the front axle output sprocket 21.

Figure 1:
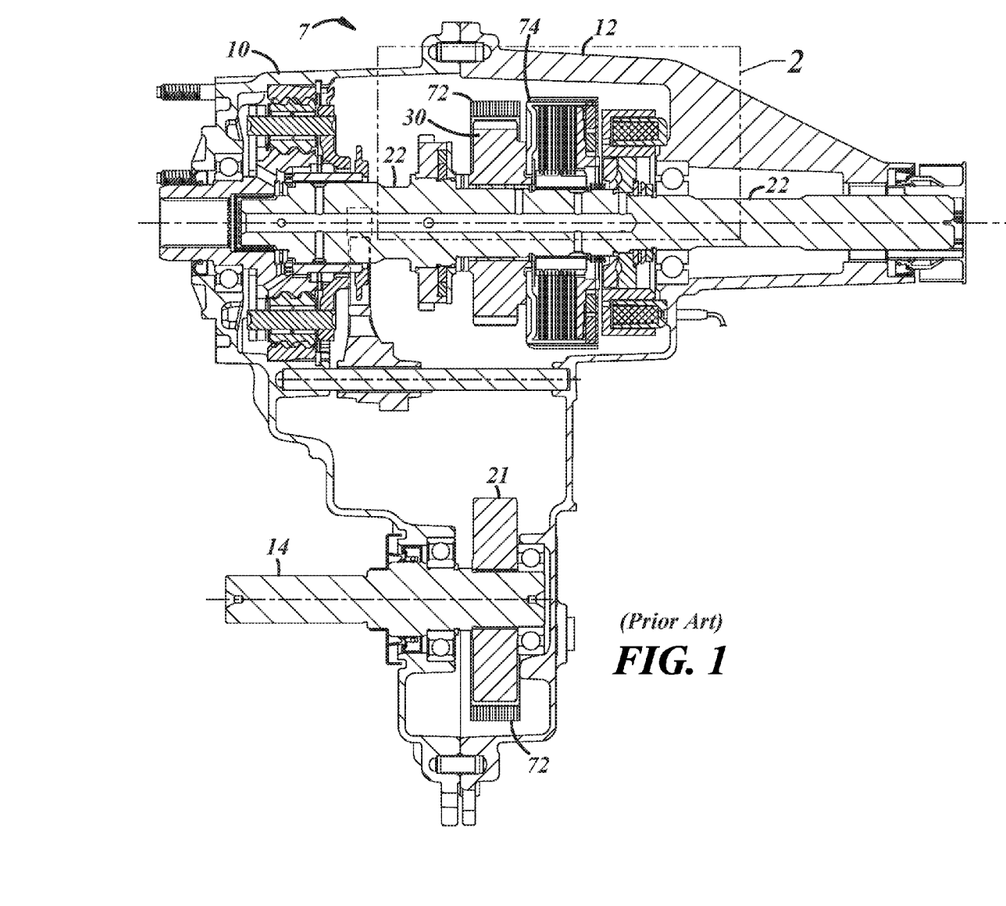
FIG. 1 is a sectional view of a transfer case prior to that of the current invention.
Figure 2:
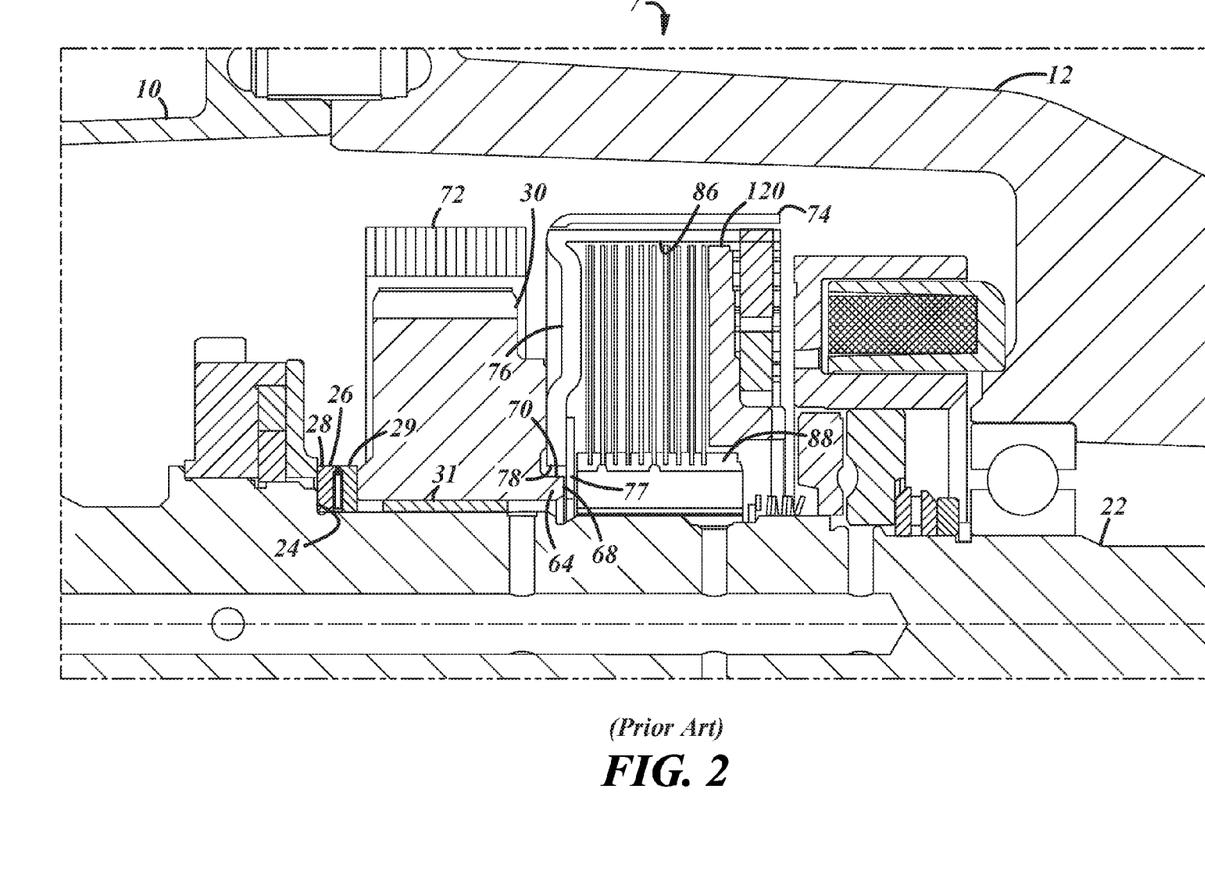
FIG. 2 is an enlargement of a portion of the transfer case shown in FIG. 1.
Figure 3:
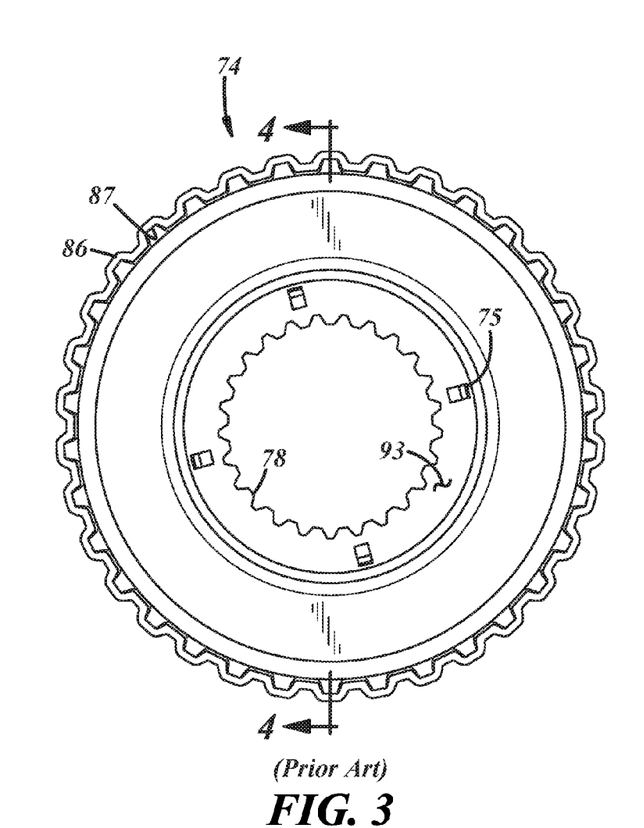
FIG. 3 is a front elevational view of a clutch housing of a transfer case shown in FIG. 1.
Figure 4:
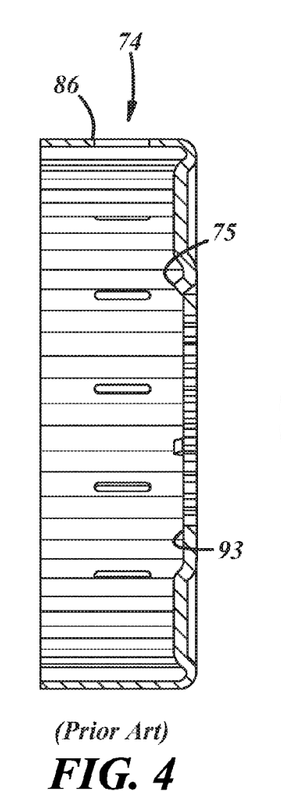
FIG. 4 is a sectional view of the clutch housing shown in FIG. 3.

A clutch housing 74 is provided having a generally radial portion 76 with a central splined opening 78 torsionally connected to the main sprocket axial extension 64. Typically the clutch housing 74 is fabricated from non-heat treat hardened steel. Clutch housing 74 also has an internally splined axially extending skirt 86.

A hub 90 provided spline connected to main input shaft 22. The hub 90 is axially moveable on main input shaft 22 and is generally axially aligned with the clutch housing skirt 86. The hub 90 has a splined outer diameter surface 88.

A clutch or friction pack 102 is provided having a first plurality of friction members 85 torsionally connected to the clutch housing skirt 86 via the clutch housing skirt's splined inner diameter 87. The first friction members or plates 85 are axially intertwined with a second plurality of friction members 89 spline connected with the hub 90's outer diameter 88. The friction members 85 and 89 are typically provided by metal plates coated with friction material intertwined with uncoated metal plates. The friction member 85 often can have a radial width significantly less than the radial width friction members 89.

A pressure plate 120 is provided spline connected to the hub outer diameter 88 to selectively compressively activate friction pack 102. A first ball ramp 121 is spline connected to the main input shaft axially spring biased away from the pressure plate 120. A second ball ramp 123 is provided for axially displacing the first ball ramp 121 to cause the friction pack 102 to torsionally connect the main input shaft 22 via the hub 90, friction pack 102 with the clutch housing 74 and main sprocket 30 and chain 72. The above connection torsionally connects the front axle output shaft 14 with the main input shaft 22.

Figure 5:
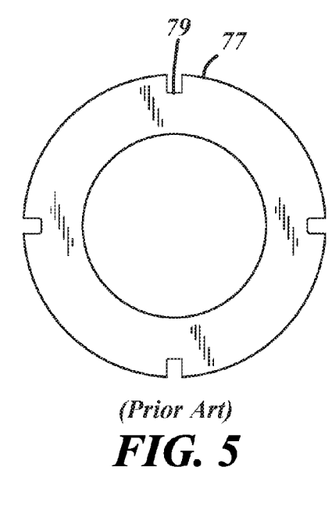
FIG. 5 is a front elevational view of a flat thrust washer utilized in the transfer case of FIG. 1.
Figure 6:
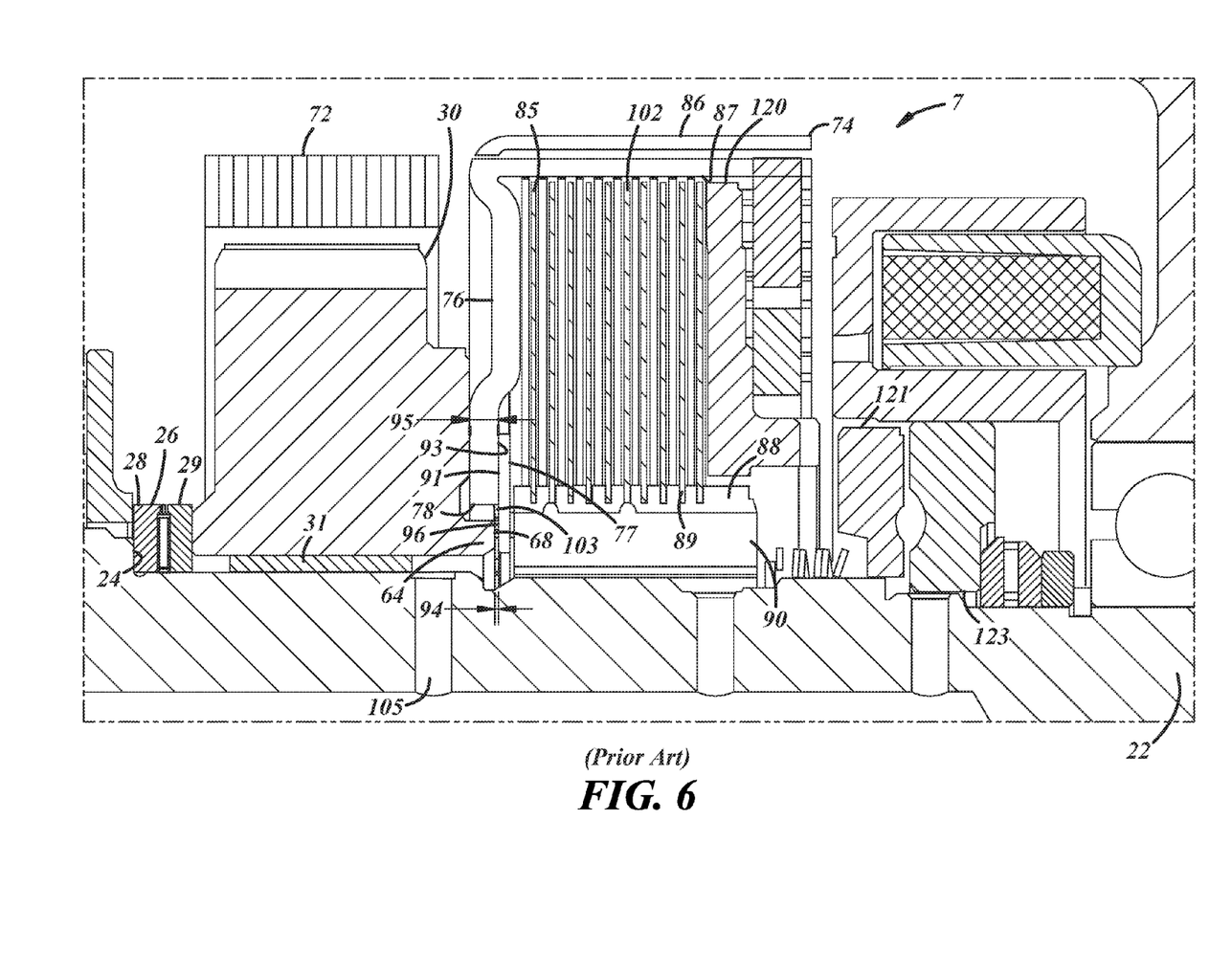
FIG. 6 is a further enlargement of a portion of the transfer case shown in FIG. 2.

The axial movement of the pressure plate 120 causes an axial reaction force against the friction pack 102 forcing the hub 90 against the radial portion 76 of the clutch housing 74. The clutch housing 74 is typically fabricated from a non-heat treat hardened stamping. Accordingly an outer radial portion of the hub 90 will wear into the clutch housing. To avoid the cost associated with heat treating the clutch housing 74, the clutch housing 74 is shielded by a heat treated hardened steel flat plane thrust washer 77. The clutch housing radial portion 76 has upended tabs 75 (FIG. 4) that locate the flat plane thrust washer cut outs 79 (FIG. 5).

To minimize rattle, a front face 91 (FIG. 6) of the thrust washer 77 should axially abut a rear inner face 93 of the clutch housing in a near perfect flat flush manner. Therefore sprocket extension 64 is purposefully axially rearward a distance 94 that is less than an axial thickness 95 of the clutch housing to ensure that the flat thrust washer 77 is flush against the front face 91. The above noted arrangement unfortunately ensures an oil pressure leakage path 96 for the pressurized lubricant forming from passage 105 in the main shaft between the front face 91 of the flat thrust washer and the rear axial face 68 of the extension. Additionally the full axial width of the clutch housing splined opening 78 cannot be torsionally engaged with the main sprocket axial extension 64. Torsional connection is further limited by a lead in chamber 103 on the splined outer diameter surface 70 on the sprocket extension 64. The lack of total engagement of the clutch housing splined opening 78 reduces the ultimate force transmitting capacity of the clutch housing.

It is desirable to provide a transfer case similar to that as described above wherein the flat thrust washer 77 positioned between the clutch housing 74 and the hub 90 is eliminated. Elimination of the flat thrust washer 77 not only lowers the cost of the transfer case but also eliminates opportunity for rattle and noise generated by the thrust washer. Additionally, elimination of thrust washer eliminates the aforementioned lubrication leakage path from in front of the flat flush washer 77 and the splined hub. Elimination of the thrust washer also simplifies fabrication of the clutch housing 74 since the clutch housing is delivered from any requirement to have the locking tabs 75 that keep the flat thrust washer 77 in position. Additionally the flat thrust washer 77 does not have to be staked in position to retain its position during transfer case assembly.

SUMMARY OF THE INVENTION

To make manifest the above noted and other gainful desires, a revelation of the present invention is brought forth. The present invention brings forth the freedom of a transfer case for a normally rear wheel drive vehicle with selective four wheel drive capabilities, wherein a requirement for a flat thrust washer typically juxtaposed between a clutch housing and a hub for the friction pack torsionally connected with the clutch housing is emancipated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 7:
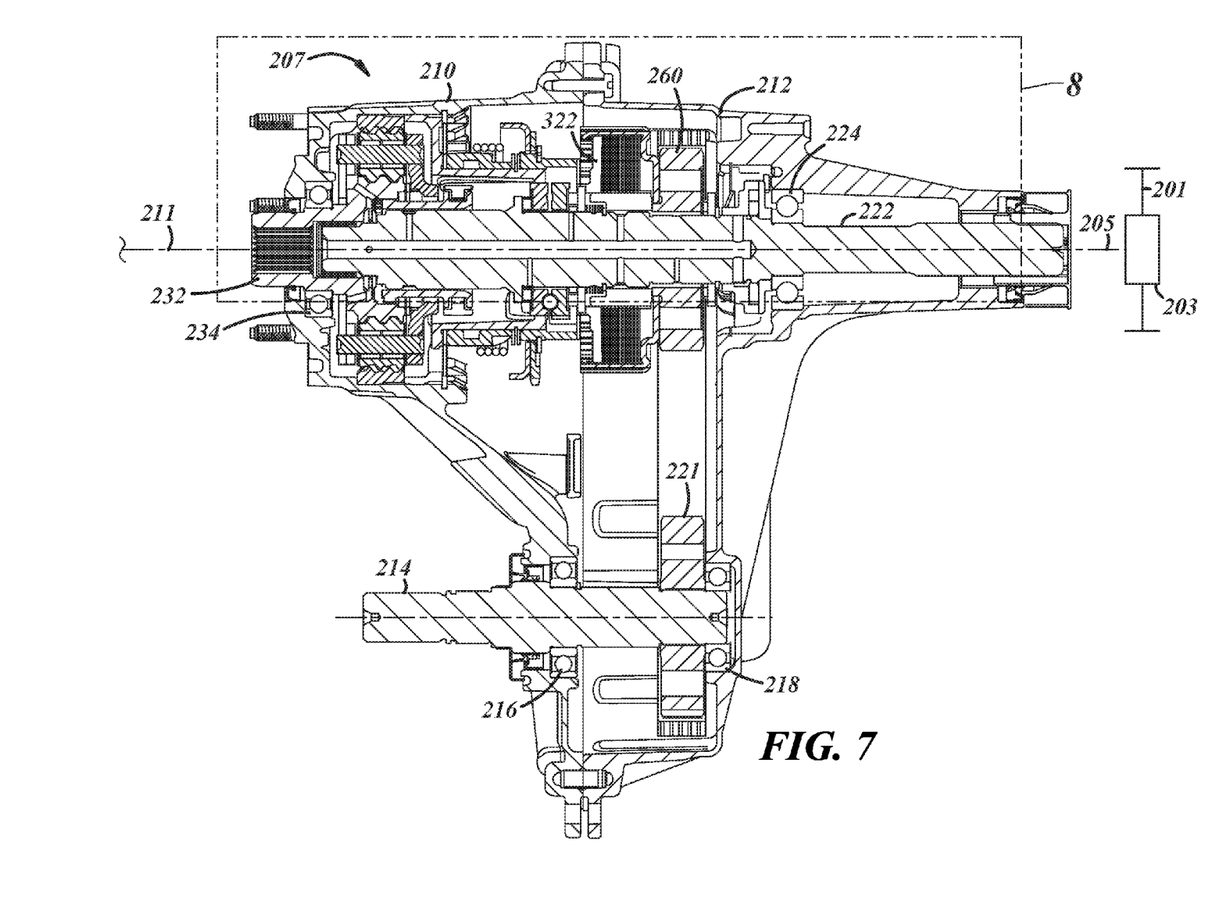
FIG. 7 is a sectional view of a preferred embodiment transfer case according to the present invention.
Figure 8:
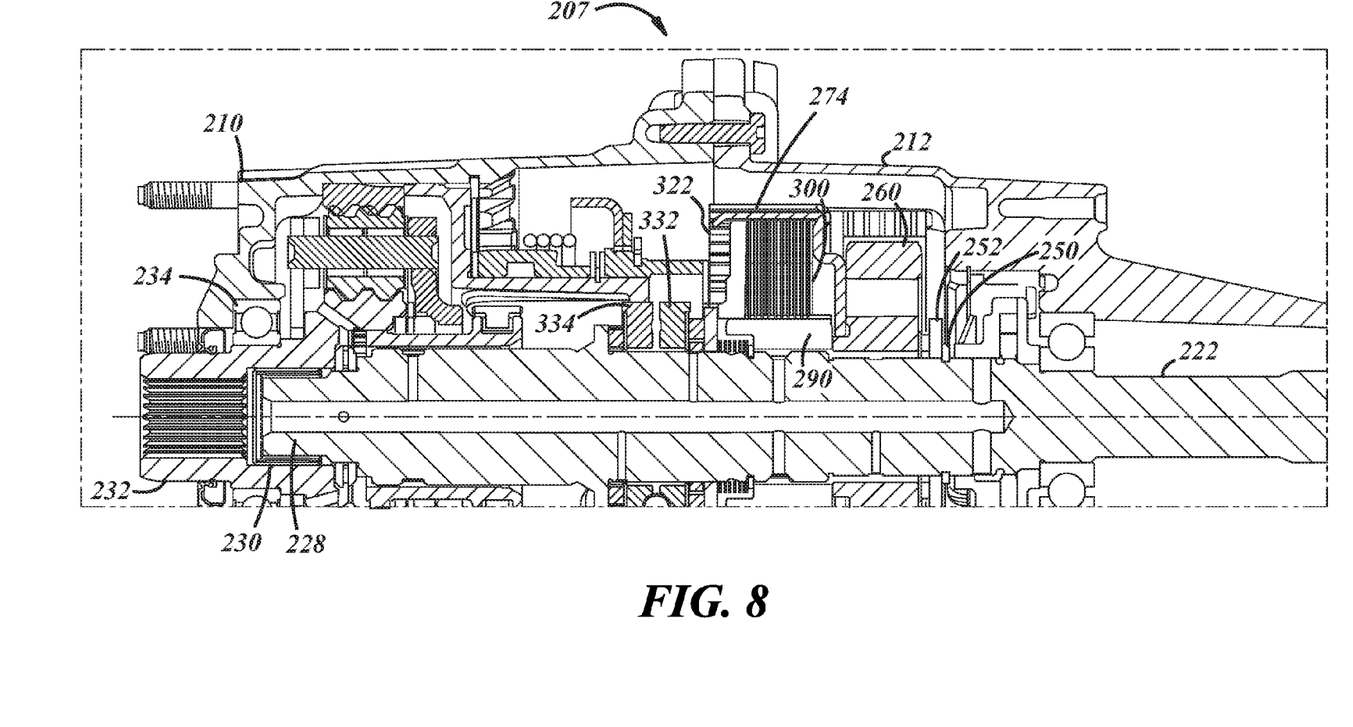
FIG. 8 is an enlargement of the sectional view of the transfer case shown in FIG. 7.
Figure 9:
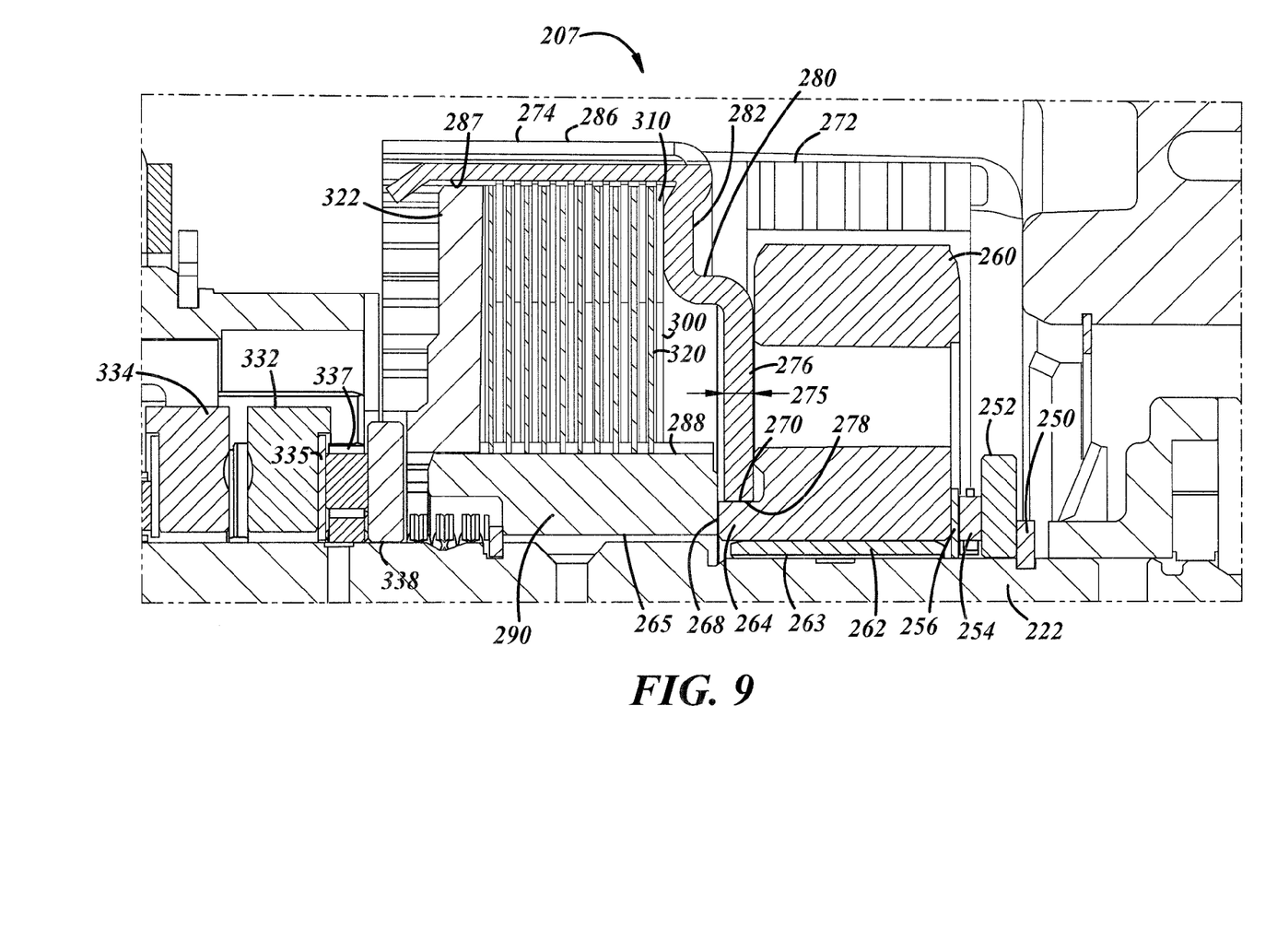
FIG. 9 is a further enlargement of the sectional view of the transfer case shown in FIG. 8.

Referring to FIGS. 7, 8 and 9, a transfer case 207 according to the present invention is provided. The transfer case 207 has a normally two wheel drive mode of operation and selective four wheel drive operational modes of operation. In its two wheel drive operation, transfer case 207 powers a rear axle 201 (shown schematically) of the vehicle via a differential 203 and prop shaft 205. The transfer case 207 has a front shell 210 that is boltably connected with a rear shell 212. A front axle output shaft 214 is bearingly supported by bearings 216 and 218, which are positioned in the front and rear shells 210 and 212 respectively. The front axle output shaft 214 extends towards the front of the vehicle to connect directly or via a coupling (not shown) with a front differential (not shown) of the vehicle. A front axle output sprocket 221 is torsionally connected in a fixed manner to the front axle output shaft 214.

The transfer case 207 also has a main input shaft 222. The main input shaft towards its rear end is bearingly supported in the rear shell 212 by bearing. 224. A rear end 226 of the main input shaft is torsionally connected with the prop shaft 205 which is in turn connected with a rear axle 201 of the vehicle via a rear differential 203. A front end 228 of the main input shaft is supported by front shell 210 via needle bearings 230 (FIG. 8) positioned within an inner bore of an input gear 232. The input gear 232 is torsionally connected to an output shaft 211 (shown schematically) of the transmission the vehicle. The input gear to 232 is rotatably supported within the front shell 210 by a roller bearing 234. The main input shaft 222 is powered by the input gear to 232 in a manner similar to that as described in co-assigned U.S. Patent Application No. 62/296,408.

The main input shaft 222 has a radial groove supporting a snap ring 250. Snap ring 250 juxtaposes bearing race or washer 252 from a series of bearing rollers 254. A smaller washer 256 provides a bearing race opposite washer 252. The combination of the snap ring 250, washers 252 and 256 and rollers 250 provide a first thrust bearing and axial stop.

Positioned axially against the washer 256 is a main sprocket 260. The main sprocket 260 is rotatably mounted on the main input shaft 222. A bearing bushing 262 is press fitted with the internal bore of the main sprocket 260. The main sprocket 260 is fabricated from a heat treated hardened material, typically steel. Extending generally opposite the first thrust washer, the main sprocket has an axially extending extension 264. The extension 264 has an axial face 268. The extension 264 is splined along its outer diameter surface 270. A chain 272 torsionally connects the main sprocket 260 with the front axle sprocket 220. The chain 272 has a partial axial overlap with the extension 264 and the bushing 262.

A clutch housing 274 is also provided. The clutch housing 274 has a generally radial extending portion 276 with a partial axial overlap with the chain 272. The clutch housing radial extending portion 276 has a splined inner diameter or opening 278 to allow the clutch housing to be torsionally connected with the main sprocket extension 264. The clutch housing radial extending portion has an axial bend 280 that is joined to a friction pack backup stop 282. The friction or clutch pack backup stop 282 is torsionally joined with a generally axial extending skirt 286. The skirt 286 has a splined inner diameter 287.

The main sprocket extension 264 axially extends beyond the clutch housing generally radial portion splined opening 278. Any lead end chamfer on the extension is axially beyond the clutch housing splined opening 278. Therefore there is full torsional engagement of the total width 275 of the clutch housing splined opening. The above noted arrangement allows the clutch housing 274 to have a higher torsional capacity for the same spatial envelope, thereby allowing an increase in the number of friction members/plates in a friction pack 300.

The bushing 262 extends axially radially inward or underneath a majority of the axial extension 264 and the clutch housing splined opening 278. The bushing has an inner diameter 263 that is smaller than an inner diameter 265 of a hub 290.

The hub 290 is spline connected on the main input shaft 222 forward of the main sprocket 260. The hub 290 is axially movable with the main input shaft and is generally axially aligned with the clutch housing skirt 286. The hub 290 has a splined outer diameter surface 288.

A friction pack 300 is provided. The friction pack has a first plurality of friction members 310 torsionally connected the clutch housing skirt's via the clutch housing skirt inner diameter spline. The first friction members 310 (typically plates) intertwine with a second plurality of friction members 320 spline connected with the hub outer diameter. The second plurality of friction members 320 typically will be metal plates with a consumable friction material coated or attached on opposite surfaces of the metal plates.

A pressure plate 322 is provided. The pressure plate is spline connected to the outer diameter of the hub 290 is provided for selective compressing of the friction pack 300 to selectively torsionally connect the front axle output shaft 214 with the main output shaft 222.

A first ball ramp 332 faces a corresponding second ball ramp 334. The first ball ramp 332 is spring biased away from the pressure plate 322. Relative rotation between the first and second ball ramps 332, 334 causes the ball ramps to axially separate from one another. Movement of the first ball ramp 332 presses against a forward thrust bearing or washers 335, 337, 338 which in turn causes the pressure plate 322 to move to torsionally connect the main input shaft 222 with the front axle input shaft 214. A more detailed explanation of the interaction between similar but not identically powered first and second ball ramps can be gained by a review of U.S. Pat. No. 5,839,328, commonly assigned. Actuation of the first ball ramp 332 (in the actuating direction) moves the pressure plate 322 causing the hub 290 to react into the extension 264 of the main sprocket 260. Since the hub 290 and main sprocket 260 are both fabricated from hardened metal materials there is no need for a flat thrust washer between the hub and the main sprocket. Since the prior flat thrust washer between the clutch housing and the sprocket hub is eliminated, the reactionary force from the pressure plate to the first thrust washer is more radially inward than the reaction force of the transfer case 7 previously described.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A transfer case for a vehicle having a normal two wheel rear drive mode and a selective four wheel drive mode, said transfer case comprising:
   a front shell boltably connected with a rear shell;
   a front axle output shaft supported by a bearing in said front shell and supported by a bearing in rear shell;
   a front axle output sprocket torsionally connected on said front axle output shaft;
   a main input shaft supported by a bearing in said front shell and supported by a bearing in said rear shell, said main input shaft being torsionally connected with a transmission of said vehicle and a rear axle of said vehicle;
   a first thrust bearing being positioned axially adjacent an axial stop on said main input shaft;
   a heat treated hardened main sprocket, rotatably mounted on said main input shaft by a bushing, said main sprocket having an axial side positioned against said first thrust bearing, said main sprocket having a radially inward axial extension extending generally opposite said first thrust bearing, said axial extension having a splined outer surface, said axial extension having an axial face;
   a chain torsionally connecting said main sprocket with said front axle output sprocket, said chain partially axially overlapping said sprocket radially inner axial extension;
   a clutch housing having a generally radial portion with a splined opening torsionally connected with said main sprocket radially inner axial extension, said radial extending portion being connected with an axial bend connected with a friction pack backup stop, said friction pack back up stop being axially forward of said radial portion splined opening, and wherein said radial extending portion is at least partially axially overlapped by said chain, said clutch housing splined opening being partially axially overlapped by said chain, said housing having an internally splined axially extending skirt;
   a hub having a spline connection with said main input shaft, said hub being axially movable on said main input shaft, said hub being generally axially aligned with said clutch housing skirt, said hub having a splined outer diameter, and wherein said hub is forward of said main sprocket;
   a clutch pack having a first plurality of friction members torsionally connected with said clutch housing skirt via said clutch housing skirt, said first friction members being axially intertwined with second plurality of friction members having a splined connection with said hub outer diameter;
   a pressure plate spline connected to said hub outer diameter to compress said clutch pack;
   a first ball ramp spline connected to said main input shaft, axially spring biased away from said pressure plate;
   a second ball ramp wherein relative rotation between said first and second ball ramps axially displaces said first ball ramp to selectively axially move said pressure plate to torsionally join said main input shaft to said front axle input shaft and to cause said main sprocket to axially react into said first thrust washer by direct contact with said main sprocket radially inner axial extension axial face;
   wherein said main sprocket bushing extends axially underneath said clutch housing splined opening and said main sprocket bushing has an inner diameter less than an inner diameter of said hub and wherein said clutch housing splined opening is fully torsionally engaged with said main sprocket radially inner axial extension and main sprocket radially inner axial extension extends beyond said clutch housing splined opening;
   wherein a portion of said main sprocket bushing underneath said sprocket radially inner axial extension is axially overlapped by said chain; and
   wherein said hub can directly contact said main sprocket radially inner axial extension with no washer between said hub radially inner axial extension and said hub.

2. A transfer case as described in claim 1 wherein said clutch backup stop is in the outer radial half of said clutch housing.

* * * * *